United States Patent [19]

Barry

[11] Patent Number: 5,151,181
[45] Date of Patent: Sep. 29, 1992

[54] FILTER SYSTEM FOR WET VACUUM CLEANING APPARATUS

[75] Inventor: Robert M. Barry, St. Paul, Minn.
[73] Assignee: CFR Corporation, Roseville, Minn.
[21] Appl. No.: 676,830
[22] Filed: Mar. 28, 1991
[51] Int. Cl.⁵ .............................................. B01D 29/15
[52] U.S. Cl. .................... 210/338; 210/342; 210/442; 210/453; 210/487
[58] Field of Search ............... 210/338, 342, 442, 453, 210/458, 487

[56] References Cited

U.S. PATENT DOCUMENTS

| | | | |
|---|---|---|---|
| 2,670,852 | 3/1954 | Davidson | 210/442 |
| 2,702,638 | 2/1955 | Nugent | 210/458 |
| 3,167,507 | 1/1965 | Burhans et al. | 210/442 |
| 3,233,738 | 2/1966 | Burhans et al. | 210/458 |
| 3,476,249 | 11/1969 | Gray et al. | 210/458 |
| 3,508,657 | 4/1970 | Cooper | 210/442 |
| 3,667,613 | 6/1972 | Angold | 210/342 |
| 4,525,275 | 6/1985 | Ostlund | 210/342 |
| 4,909,937 | 3/1990 | Hoffmann et al. | 210/338 |

Primary Examiner—Robert A. Dawson
Assistant Examiner—W. L. Millard
Attorney, Agent, or Firm—John W. Adams

[57] ABSTRACT

The liquid filter assembly including a filter housing with an inlet below a prescribed external liquid level and having a generally cylindrical filter unit inside it with reusable filter elements which effectively operate at low pressure drops and permitting bypass liquid to recirculate within the filtered section without passing through the filter element and providing a filter support frame having the filter element supported thereon to provide a changeable filter assembly unit sealingly mounted within the housing.

12 Claims, 1 Drawing Sheet

FILTER SYSTEM FOR WET VACUUM CLEANING APPARATUS

BACKGROUND OF THE INVENTION

In the past, the number of different filtering systems have been embodied in liquid-vacuum cleaning equipment such as may be used for cleaning carpets and upholstery. Such filtering systems are the subject of U.S. Pat. No. 4,696,075 issued Sep. 29, 1987 to Dale L. Grave of Plymouth, Minn., and an application for U.S. patent Ser. No. 7/556,175, filed Jul. 23, 1990, invented by Robert M. Barry, inventor of the present invention disclosed therein and assigned to a common assignee, CFR Corporation of Roseville, Minn. The prior inventions identified above relate to filter systems which rely on back washing of the filter element when the pumping system is in a bypass mode of operation and ultimately requires replacement of a filter cartridge when back wash cleaning is no longer effective.

My present system permits bypass recirculation of liquid without circulation through the filtering assembly and also provides a relatively simple yet versatile filtering system which eliminates the need for frequent filter replacement by providing reusable filter elements and an extremely easy to change simplified filter assembly design.

SUMMARY OF THE INVENTION

The present invention constitutes a relatively simple multiple stage filter system particularly adapted for use with wet vacuum cleaning apparatus whereby the filter elements are extremely versatile with respect to adapting the same for different filtering needs and characteristics and also provides reusable filter elements which can be quickly and easily changed.

The present system specifically includes a bypass liquid flow control which not only bypasses the cleaning head of the cleaning apparatus but also bypasses the filter elements themselves whenever the cleaning apparatus is not in a liquid spraying mode of operation.

DETAILED DESCRIPTION OF A PREFERRED EMBODIMENT

Figure 1:
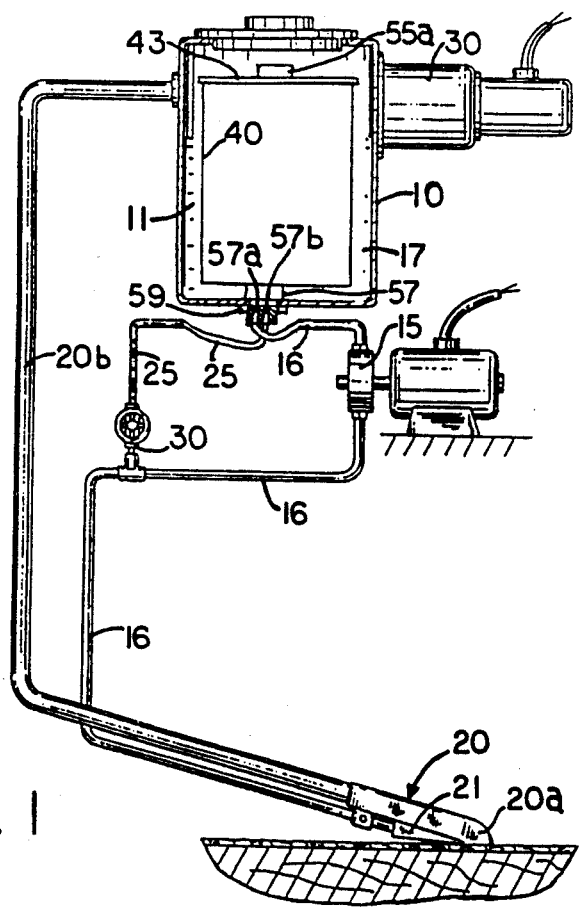
FIG. 1 is a diagramatic view of a wet vacuum cleaning system embodying this invention.

FIG. 1 shows a wet vacuum cleaning system with which the filter assembly embodying this Invention can be used. Such a system includes a supply tank 10 having cleaning liquid 11 stored therein. A pump 15 delivers liquid from the tank 10 to a combined vacuum and spray head 20 having spray nozzles 21 and a vacuum nozzle 20a. A vacuum motor 30 supplies suction to the vacuum nozzle 20a through a conduit 20b in the conventional manner.

A bypass valve 30 is provided to control the bypass flow of liquid back into the tank 10 according to the pressure produced in line 16. A conventional operator control valve (not shown) controls the liquid flow through the nozzle head 21 and thereby controls the pressure in the supply line 16.

A filter system is mounted within tank 10 and includes a housing 40 having a bottom 41, sidewall 42, and a removeable top cover 43. A liquid inlet 40a is provided in the bottom of sidewall 42. A two stage filter is shown having a pair of generally cylindrical filter assemblies 45 and 46 which are concentrically mounted within the housing 40, and an unfiltered section 40b surrounds the outer filter assembly 45, and an inner filter assembly 46 defines a filtered section 40c therewithin.

Figure 3:
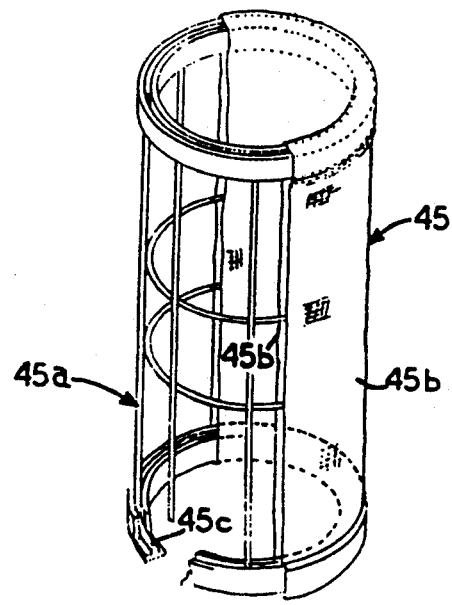

The filter assembly 45 includes a supporting cylindrical frame unit 45a surrounded by a cylindrical filter cover or element 45b, which is somewhat longer than the cage 45 and is wrapped around the top and bottom ends of said cylindrical frame 45a to provide an outer cylindrical filter wall. The filter element 45b has stretchable elastic bands providing a drawstring effect at the top and bottom to maintain the ends of the filters in position around the ends of the frame unit 45a. A double filter may be provided around the frame by installing an inner filter element 45b within the cylindrical frame 45a as shown in FIG. 3. The inner concentric filter assembly 46 includes frame 46a of smaller diameter and having a cover of filter material 46b around the outside thereof and sealingly wrapped around the top and bottom ends thereof to form a filter wall in the same manner as outer filter assembly 45. This inner assembly 46 may also embody a double filter cover 46b.

The filter cover units 45b and 46b, made from monofilament nylon mesh having a micron rating of between 20 and 100, may be used to produce the desired minimal pressure drop across the filter. The filters may have the same or different filtering characteristics as may be desired. For example, the outer filter covers 45b may be coarser, while the inner filter layer 46b may be a finer mesh. The ends of each of the frame elements 45a and 46a may be provided with circumferential grooves into which circular gasket 45c (shown at the bottom of frame 45a in FIG. 3) may be inserted to seal one or both ends thereof. Gasket 45c may be provided at both the top and bottom of the two filter assemblies 45 and 46 to assist in sealing both the top and bottom portions of the housing.

A plurality of filter stabilizing members such as the four circumferentially spaced posts 50 have their lower ends secured to the housing bottom 41 as by mounting screws 51. The posts 50 maintain the cylindrical filter assemblies 45 and 46 in the desired spaced apart concentric relation.

Figure 2:
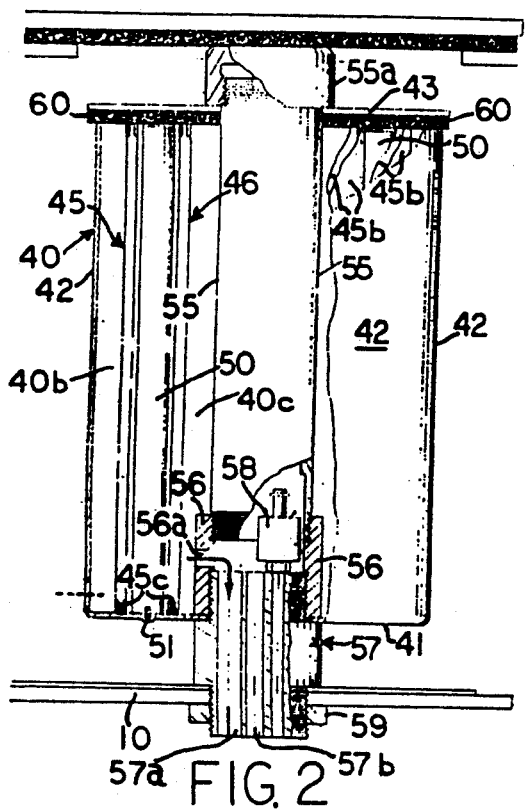
FIG. 2 is a vertical sectional view of the filtering apparatus embodying this invention; and, FIG. 3 is a perspective view of one of the filter support frames with filters mounted thereon.

A stand pipe 55 is rigidly mounted within the housing 40 and extends up above the center of the bottom 41 as best shown in FIG. 2. The stand pipe is supported on a coupling member 56 which connects pipe 55 to a base plug member 57 and serves to sealingly clamp the base plug to the bottom 41 of the housing 40 and also serves to raise the bottom 41 above the bottom of the tank 10. The base plug 57 has two separate passages 57a and 57b drilled therein. Passage 57a is connected to the main supply line 16 to the pump 15, and the other passage 57b is connected to the bypass supply line 25. Both passages 57a and 57b connumicate through passage 56a with the inner filtered section 40c inside of filters 45 and 46 within housing 40.

The cover 43 is positively clamped on the top edge of the housing 40 as by screw cap 55a screwed onto the top of stand pipe 55. A suitable gasket 60 seals the joint between the cover 43 and the top of sidewall 42 of the housing and also provides the required sealing and anchoring pressure for both the upper and lower edges of the filter assemblies 45 and 46.

The present invention provides easily changeable filter assembly units which embody the filter frame with the filter element mounted thereon. The filter assembly 45 is positioned outside of the stabilizing posts 50, and the filter assembly 46 is positioned within the stabilizing posts as shown in FIG. 2. The cover 43 may be quickly and easily removed by removing the screw cap 55a from the top of the stand pipe 55. The gasket 60 is an annular disk which surrounds the stand pipe when the cover 43 is in assembled closed position as shown in FIG. 2. It will be apparent that each of the filter assemblies 45 and 46 may have a pair of filter covers 45b and 46b or may be used with only a single cover as desired. The connection of the pump bypass into the center of the housing 40 within the filter discontinues the filtering process when fluid is not being discharged from the spray nozzles 21. The shut off float valve 58 is of conventional design and shuts off the pump motor when the level within the filtered section of the housing falls below the predetermined critical limit such as when the filter elements become clogged.

What is claimed is:

1. A filter system for wet vacuum cleaning apparatus, said apparatus comprising,
   a filter housing having a lower portion and adapted to be mounted in a liquid reservoir tank with the lower portion of the housing disposed below the normal liquid level in the tank, said housing having a top, a bottom, and side-walls defining a filter chamber therein and having an inlet port disposed below the normal liquid level in the tank,
   a filter assembly including a first supporting frame with filter element supported thereon, said assembly being mounted in the chamber and extending from the top to the bottom thereof to divide the chamber into an unfiltered liquid first housing section and a filtered liquid second housing section, said filter element having a sealed connection at the top and bottom of the housing to prevent solids from passing from the first section to the second section,
   a pump intake port communicating with the filtered liquid second section,
   and wherein the filter supporting frame constitutes a generally cylindrically shaped grid unit, a generally cylindrically shaped filter sleeve removably mounted on said unit and having ends which, with the grid unit, are respectively sealed against the top and bottom of the housing,
   a second filter supporting frame concentrically mounted within the first frame and,
   a filter element supported on the second frame and having upper and lower ends thereof sealed against the top and bottom of the housing to provide a two stage filter within the housing to provide a double filtered water supply for the pump intake port,
   and said first and second filter having a predetermined annular spacing therebetween, and
   a plurality of filter positioning posts mounted in said annular spacing for maintaining the alignment of the supporting frames and extending substantially from top to bottom of the chamber, and
   a center stand pipe extending from the bottom to the top of said filter housing and having a removable cap connected to the top thereof for engaging the removable top of the housing and securely pressing the same downwardly into sealed engagement with the top of the housing sidewalls and the ends of the filter assemblies.

2. The structure set forth in claim 1 wherein the top of the filter housing is readily removeable to facilitate changing the filter element supported therein.

3. The structure set forth in claim 2 wherein the filter element may be varied to obtain the desired degree of filtration.

4. The structure set forth in claim 1 wherein the housing is removeable and both of said frames and filter elements are readily replaceable.

5. The structure set forth in claim 1 wherein the pump intake is spaced above the bottom of the filter housing.

6. The structure set forth in claim 1 wherein the inlet port in the filter housing is spaced a substantial distance below the surface level of the liquid in the reservoir tank.

7. The structure set forth in claim 1 wherein the inlet port is adjustable peripherally within the reservoir tank to provide minimal influx of heavily contaminated fluid into the filter chamber from the tank.

8. The structure set forth in claim 1 wherein the filter element is made from a reusable filter sheet material capable of being cleaned when dirty.

9. The structure set forth in claim 1 wherein the filter element is made from a material sufficiently porous to pass the liquid without producing a substantial pressure drop there across.

10. The structure set forth in claim 9 wherein the filter material is made from mono-filament nylon and has a micron rating of between 20 and 100 microns.

11. A filter system for wet vacuum cleaning apparatus, said apparatus comprising,
    a filter housing having a lower portion and adapted to be mounted in a liquid reservoir tank with the lower portion of the housing disposed below the normal liquid level in the tank, said housing having, a top, a bottom, and sidewalls defining a filter chamber therein and having an inlet port disposed below the normal liquid level in the tank,
    a filter assembly including a supporting frame with filter element supported thereon, said assembly being mounted in the chamber and extending from the top to the bottom thereof to divide the chamber into an unfiltered liquid first housing section, said filter element having a sealed connection at the top and bottom of the housing to prevent solids from passing from the first section to a second housing section,
    a pump intake port communicating with the filtered liquid second section, and
    a plug element mounted in the bottom of the housing and provided with a pair of passages therein, one of said passages forming the pump intake and the other forming a bypass discharge both confined within said second housing section.

12. A filter system for wet vacuum cleaning apparatus, said apparatus comprising,
    a filter housing having a lower portion and adapted to be mounted in a liquid reservoir tank with the lower portion of the housing disposed below the normal liquid level in the tank, said housing having a top, a bottom and sidewalls defining a filter chamber therein and having an inlet port disposed below the normal liquid level in the tank,
    a filter assembly including a supporting frame with filter element supported thereon, said assembly being mounted in the chamber and extending from the top to the bottom thereof to divide the chamber into an unfiltered liquid first housing section and a filtered liquid second housing section, said filter element having a sealed connection at the top and bottom of the housing to prevent solids from passing from the first section to the second section, a pump intake port communicating with the filtered liquid second section, wherein the filter supporting frame constitutes a generally cylindrically shaped grid unit, a generally cylindrically shaped filter sleeve removably mounted on said unit with the ends of the sleeve and grid unit respectively sealed against the top and bottom of the housing, wherein at least one of the ends of the filter supporting frame and filter element assemblies include an anti-leak gasket system that ensures isolation of the first unfiltered liquid housing section from the filtered liquid second housing section, and wherein the filter supporting assembly includes a circumferential groove, and the anti-leak gasket constitutes a circular member having a generally T-shaped gasket with the stem portion of the T being inserted into the groove to provide stability for the gasket formed by the cross portion of the gasket shape.

* * * * *